United States Patent [19]
Gillich

[11] Patent Number: 5,760,981
[45] Date of Patent: Jun. 2, 1998

[54] ALUMINUM REFLECTOR WITH A COMPOSITE REFLECTIVITY-ENHANCING SURFACE LAYER

[75] Inventor: Volkmar Gillich, Neuhausen am Rheinfall, Switzerland

[73] Assignee: Alusuisse Technolgy & Management Ltd., Switzerland

[21] Appl. No.: 701,313

[22] Filed: Aug. 21, 1996

[30] Foreign Application Priority Data

Sep. 12, 1995 [CH] Switzerland .............. 2574/95

[51] Int. Cl.$^6$ .............. G02B 5/08; G02B 1/10; C23C 28/00; C25D 11/04
[52] U.S. Cl. .............. 359/883; 205/188; 205/189; 205/324; 359/585
[58] Field of Search .............. 359/359, 360, 359/838, 884, 883, 585, 584; 205/188, 189, 190, 324–332; 427/162

[56] References Cited

U.S. PATENT DOCUMENTS

4,737,246  4/1988  Powers et al. .............. 205/325

FOREIGN PATENT DOCUMENTS

0280299  8/1988  European Pat. Off. .

OTHER PUBLICATIONS

Optical Engineering, Bd. 32, Nr. 3, Mar. 1993, Bellingham, WA, Seiten 547–552, K.H. Guenther et al.: "Corrosion–Resistant Front Surface Aluminum Mirror Coatings".

Patent Abstracts of Japan, vol. 4, No. 103, Jul. 23, 1980. Japanese Publication No. 55 062411, published May 10, 1980.

Patent Abstracts of Japan, vol. 7, No. 142, Jun. 22, 1983. Japanese Publication No. 58 055901, Apr. 2, 1983.

*Primary Examiner*—Jon W. Henry
*Attorney, Agent, or Firm*—Bachman & LaPointe, P.C.

[57] ABSTRACT

Reflector having a composite reflectivity enhancing layer as reflecting surface layer on a reflector body where the said composite has a sandwich structure with an aluminum layer facing the reflector body, an outer layer, the HI-layer, with a refractive index $n_2$ facing the radiation to be reflected, and an intermediate aluminum oxide layer, the LI-layer, with a refractive index $n_1$ which is smaller than $n_2$. The LI-layer is a transparent and pore-free barrier layer produced by anodic oxidation of the aluminum layer and having a dielectric constant $\epsilon_1$ of 6 to 10.5 at 20° C. and the optical layer thickness $d_{opt,1}$ of the LI-layer and $d_{opt,2}$ of the HI-layer are such that $$d_{opt,i} = d_i \cdot n_i = l_i \cdot \lambda/4 \pm 10 \text{ nm, } i=1, 2$$

where $d_1$ represents the thickness of the LI-layer in nm, $d_2$ the thickness of the HI-layer in nm, $\lambda$ the average wave length in nm of the light striking the reflector surface and $l_1$, $l_2$, uneven natural numbers. The reflectors are particularly suitable as reflectors for infrared radiation or for lamps for technical lighting purposes, especially for daylight lighting purposes.

10 Claims, 1 Drawing Sheet

ALUMINUM REFLECTOR WITH A COMPOSITE REFLECTIVITY-ENHANCING SURFACE LAYER

BACKGROUND OF THE INVENTION

The present invention relates to a reflector having a composite reflectivity enhancing layer as reflecting surface layer on a reflector body where the said composite has a sandwich structure with an aluminum layer facing the reflector body, an outer layer, the HI-layer, with a refractive index $n_2$ facing the radiation to be reflected, and an intermediate aluminum oxide layer, the LI-layer, with a refractive index $n_1$ which is smaller than $n_2$. The invention relates further to the use of such reflectors having composite reflectivity enhancing layers and to a process for manufacturing them.

Reflectors featuring a composite layer system comprising LI/HI-layers deposited on aluminum (LI/HI=Low Refraction Index/High Refraction Index), i.e. layers exhibiting an inner layer with refractive index $n_1$ (LI) and an outer layer with a refractive index $n_2$ (HI) which is greater than $n_1$, are in general known as reflectors with surface layers that enhance reflectivity.

Such reflectors are normally produced by depositing a very thin layer of high purity aluminum onto the reflector body e.g. of glass or technical grade aluminum i.e. aluminum lower purity e.g. by means of PVD (physical vapor deposition) methods such as sputtering or vaporization. The high purity Al layer is then protected by depositing on it an LI protective layer e.g. made of $Al_2O_3$, or $SiO_2$, usually by PVD or CVD (chemical vapour deposition) methods, and enhanced by a further HI-layer to provide a LI/HI reflectivity-enhancing surface on the reflector.

Because of the small thickness of the layer, it is generally not possible to anodize PVD Al layers; consequently, the deposition of the LI- and HI-layers by PVD or CVD methods is normally carried out under high vacuum. In order to achieve high reflectivity characteristics in composite layers that improve reflectivity, it is necessary to achieve good homogeneity and to observe exactly close, exactly pre-defined, tolerances in the thickness of the individual layers. Keeping closely to the exact thickness tolerances of oxide layers deposited in high vacuum using PVD or CVD methods, and checking the thickness of these layers is difficult and requires complicated, expensive equipment. The rate of deposition of CVD or PVD layers, especially such dielectric layers, depends on the method used and compared with chemical methods, is relatively low. In view of the high cost of high-vacuum deposition units, this leads to high manufacturing costs. Furthermore, the low deposition rates and the necessity to use high-vacuum equipment for the PDV or CVD processes makes it difficult or even impossible to produce the layers in a continuous manner.

A further possibility for manufacturing composite layers providing reflectivity-enhancing composite layers is to use chemical or anodic oxidation of aluminum surfaces and subsequently to deposit a dielectric layer with a higher refractive index than aluminum. For that purpose one requires reflectors made of aluminum or reflectors with a layer of aluminum which is thick enough for anodising. Anodizing is normally performed in a sulphuric acid electrolyte using direct current. By choosing the appropriate parameters the resultant protective layer can be a homogeneous layer with predefined layer thickness but normally exhibits high porosity which is a result of the process itself.

Anodizing in a sulphuric acid electrolyte is normally called a dc-$H_2SO_4$ process (direct current-sulphuric acid process). In that process, in order to achieve sufficient reflectivity the aluminium surfaces acting as reflector surfaces are usefully chemically or electrolytically brightened and subsequently protected by means of a transparent layer e.g. using the dc-$H_2SO_4$ process. In the dc-$H_2SO_4$ process the concentration of sulphuric acid is normally 20%, the electrolyte temperature 15° to 30° C., the applied voltage 12 to 30 V and the current density up to 1 to 3 A/dm². The thickness of the protective layer achieved is typically 1 to 10 µm. The layers obtained this way are clear to yellowish.

An oxide layer produced using a dc-$H_2SO_4$ process generally comprises two layers, a pore-free, very thin base or barrier layer and a porous outer layer. The pores arise as a result of the chemical, partial resolution of the oxide layer at the surface exposed to the electrolyte. The overall thickness of the oxide skin reaches its maximum when growth and resolution rates are equal. This, in turn, depends on the composition of the electrolyte, the current density and the temperature of the electrolyte.

The oxide layers produced by anodizing in sulphuric acid are completely transparent and colorless only when produced on high purity aluminium and on AlMg or AlMgSi alloys based on high purity aluminium (Al≧99.85 wt. %). Due to the heterogeneous precipitates present in most structural alloys, the oxide layers obtained are cloudy to a greater or lesser degree. In addition, unfavorable heat treatment leads to precipitates forming in the structure which in turn results in a grey discoloration e.g. at hot spots.

Especially in the case of less pure alloys e.g. Al 99.85, Al 99.8 or, Al 99.5 the porous protective layers produced using the dc-$H_2SO_4$ process may have alloy constituents such as e.g. Fe or Si rich intermetallic phases which are incorporated in the oxide skin and cause undesired absorption and/or scattering of light. This means that the light is reflected at a wide range of angles. Consequently, the dc-$H_2SO_4$ anodizing has a negative effect on the reflectivity values such as the total reflectivity or the directional reflectivity achieved by electrolytic brightening.

The reflectivity of the surface is also reduced by absorption and scattering of the incident light as a result of the large thickness of oxide layer produced by the dc-$H_2SO_4$ process. Further, the oxide layers produced by the dc-$H_2SO_4$ process are not suitable for composite reflectivity-enhancing layers reflecting light in the visible wave length; the reason for this is that the reflectivity characteristics of such composite layers exhibit too many and too closely spaced maxima and minima that relate to the large layer thickness and are a function of the wavelength of the incident light. Finally, in the normal thickness range of 1 to 3 µm disturbing interference effects, so called iridescence, are encountered.

SUMMARY OF THE INVENTION

The object of the present invention is to provide cost-favorable reflectors with reflectivity-enhancing composite layers, in particular for lighting purposes, by means of which reflectors the above mentioned disadvantages of state-of-the-art reflectors are avoided.

That objective is achieved by way of the invention in that the LI-layer is a transparent and pore-free barrier layer produced by anodic oxidation of the aluminum layer and having a dielectric constant $\epsilon_1$ of 6 to 10.5 at 20° C. and the optical layer thickness $d_{opt,1}$ of the LI-layer and $d_{opt,2}$ of the HI-layer are such that $$d_{opt,i} = d_i \cdot n_i = l_i \cdot \lambda/4 \pm 10 \text{ nm, } i=1, 2$$

where $d_1$ represents the thickness of the LI-layer in nm, $d_2$ the thickness of the HI-layer in nm, $\lambda$ the average wave length in nm of the light striking the reflector surface and $l_1$, $l_2$, uneven natural numbers.

It must be taken into account that—because of the dispersion of the light—the refractive index n, i.e. $n_i$ or $n_2$, is a function of the wavelength i.e. in the present text $n_i$ and $n_2$ always refer to the corresponding wavelength of the light striking the reflector surface. Furthermore, it must also be taken into account that the condition $d_i.n_i=l_i.\lambda/4$, i=1, 2 to obtain a reflectivity-enhancing composite layer is completely valid only for electromagnetic radiation striking the reflector surface vertically.

The LI/HI multiple-layers comprise at least two layers that exhibit different refractive indices. The combination of a pair of dielectric layers of different refractive index on the metal surface, where the layer with the lower refractive index is situated on the metal surface enables an improvement in reflectivity characteristics to be obtained over that achieved with a single homogeneous layer. For a given layer composition the highest reflectivity can be achieved if the optical layer thickness of the individual layers amounts to $\lambda/4$ or an uneven multiple thereof. With respect to the composition of the layer materials the best reflectivity characteristics are achieved when the difference in the refractive indices of the individual layers is as great as possible.

BRIEF DESCRIPTION OF THE DRAWING

The present invention will be more readily understood from a consideration of the appended drawing, wherein.

DETAILED DESCRIPTION OF PREFERRED EMBODIMENTS

Figure 1:
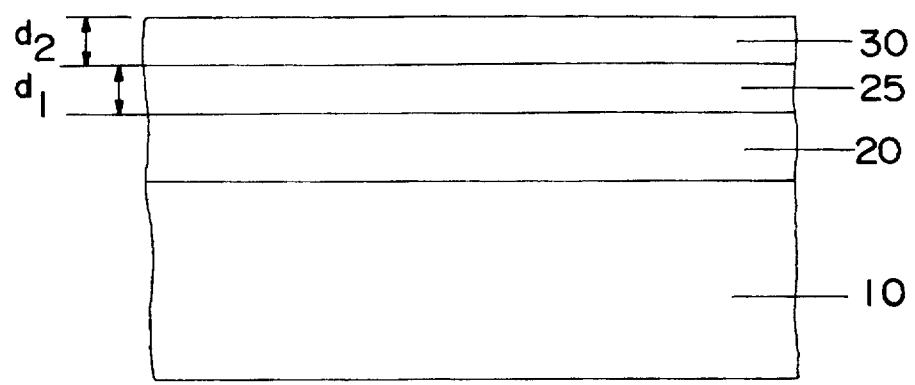
FIG. 1 is a cross-sectional view of one embodiment of the present invention.

The aluminum layer that is required facing the reflector body of reflectors according to the invention may be part of a component, e.g. a section, beam or another form of components, a strip, sheet or a foil of aluminum, or may be an aluminum outer layer of a composite material, in particular an aluminum outer layer of a composite panel, or an aluminum layer deposited e.g. electrolytically on any material of choice. In a preferred version, the item bearing the aluminum layer, i.e. the reflective body and the aluminum layer of the composite concerns a component made of aluminum which has been manufactured e.g. by a rolling, extrusion, forging or press-forming process. The item containing the aluminum layer may also be shaped by bending, deep-drawing, cold press-forming or the like.

In the present text the term aluminum is to be understood to include all grades of purity of aluminum and all commercially available alloys of aluminum. For example, the term aluminum includes all rolling, wrought, casting, forging and extrusion alloys of aluminum. Usefully, the aluminum layer is of pure aluminum having a purity level of 98.3 wt. % or more or aluminum alloys made with this purity grade and containing at least one of the elements Si, Mg, Mn, Cu, Zn or Fe. The aluminum layer of pure aluminum exhibits e.g. a purity of 98.3 wt. % and higher, usefully 99.9 wt. % and higher, preferably 99.9 wt. % and higher, especially 99.95 wt. % and higher.

Besides aluminum of the above mentioned purity, the aluminum layer may also contain 0.25 to 5 wt. %, especially 0.5 to 2 wt. % magnesium, or 0.2 to 2 wt. % manganese, or 0.5 to 5 wt. % magnesium and 0.2 to 2 wt. % manganese, especially e.g. 1 wt. % magnesium and 0.5 wt. % manganese, or 0.1 to 12 wt. %, preferably 0.1 to 5 wt. % copper, or 0.5 to 5 wt. % zinc and 0.5 to 5 wt. % magnesium, or 0.5 to 5 wt. % zinc, 0.5 to 5 wt. % magnesium and 0.5 to 5 wt. % copper, or 0.5 to 5 wt. % iron and 0.2 to 2 wt. % manganese, in particular e.g. 1.5 wt. % iron and 0.4 wt. % manganese.

The aluminum surfaces may have any desired shape and may, if desired, be also be structured. In the case of rolled aluminum surfaces, these may e.g. be treated by high gloss or designer rolls. A preferred application of structured aluminium surfaces is e.g. in the case of reflectors for daylight lighting where in particular structured surfaces exhibiting structural features of a magnitude of 0.1 to 1 mm are employed.

In order that the absorption of the electromagnetic radiation penetrating the LI/HI layers in the composite surface layers, and any, difficult to control, diffuse scattering due to the presence of pores is kept as small as possible, the LI/HI layers must be pore-free and transparent to the electromagnetic waves that are to be reflected. By the term pore-free is to be understood here not completely pore-free, but rather that the LI/HI layers of the reflectors according to the invention are essentially pore-free. Important in that respect is that in particular that the LI layer produced by anodising exhibits essentially no pores as a result of the process, which means, no pores e.g. due to the use of an electrolyte that dissolves aluminum oxide. In the case of the present invention the pore-free LI layer exhibits a porosity of less than 1%.

The dielectric constant $\epsilon_1$ of the LI layer depends, among other things, on the process parameters employed during anodizing. The dielectric constant $\epsilon_1$ of the LI layer according to the invention lies between 6 and 10.5 at 20° C., preferably between 8 and 10.

With regard to the thickness in the LI/HI layers, it was found in the course of the activities concerning the invention that the properties of reflection run essentially periodically, viz., such that with increasing layer thickness, in particular in the case of layers with optical layer thickness $d_{opt,i}$ greater than $6\lambda/4$, the reflection properties are unsuitable for technical lighting purposes. Preferred therefore are layers with an optical layer thickness that is less than $6\lambda/4$ and in particular such with $l_1$ and $l_2$ equal to 1 or 3.

In the course of the activities relating to the invention it was found that reflectors with LI/HI layer thicknesses lying in the thickness range $d_i.n_i=l_i.\lambda/4\pm10$ nm (i=1, 2) exhibit essentially the same good reflection properties so that the layer thicknesses $d_i$ do not have to comply exactly with the condition $d_i.n_i=l_i.\lambda/4$, i=1, 2.

The reflectors according to the invention find application preferably for wavelengths $\lambda=550$ nm±200 nm, especially preferably for wavelengths corresponding to the average wavelengths of visible light to which the human eye responds best in daylight, viz., at around 550 nm.

The thicknesses $d_1$ of the LI layer and $d_2$ of the HI layer are preferably between 30 and 190 nm, whereby the thicknesses $d_1$ and $d_2$ measured at any particular spot do not differ by more than ±5% from the average layer thicknesses $d_{1,av}$ and $d_{2,av}$ measured over the whole of the composite layer. This makes it possible to employ the reflectors in lighting methods offering almost loss-free reflection of electromagnetic waves, as the reproducible, homogeneous layer thicknesses in the LI/HI layers now make it possible to manufacture high grade reflectivity-enhancing reflector surfaces.

The aluminum oxide barrier layer acting as the LI layer usefully exhibits a refractive index $n_1$ of 1.55 to 1.65.

Suitable as HI layer materials are e.g. all known optical layer materials. Usefully the HI layer comprises or contains oxides of alkali metals e.g. Li, alkali-earth metals e.g. Mg, Ca, Sr, Ba and/or transition metals such as e.g. Sc, Ti, V, Cr, Mn, Fe, Co, Ni, Y, Zr, Nb, Mo, Te, Ru, Rh, Pd, Hf, Ta, W, Re, Os, Ir, Pt and/or lanthanides such as e.g. La, Ce, Pr, Nd, Pm, Dy, Yb or Lu, etc. Preferred for the reflectors according to the invention are HI layers of titanium oxide (Ti-oxide) with a refractive index of approx. 2.5, praseodymium-titanium oxide (PrTi-oxide), lanthanum-titanium oxide (LaTi-oxide), tantalum oxide (Ta-oxide), hafnium oxide (Hf-oxide), niobium oxide (Nb-oxide), Zn-oxide, Ce-oxide or an oxide of an alloy of the mentioned materials. Especially preferred are, however, HI layers of $TiO_2$, Ta-oxide, PrTi-oxide or LaTi-oxide.

The reflectors according to the invention find preferred use for technical lighting purposes or as reflectors for infra-red radiation. An especially preferred use for the reflectors according to the invention is in lamps for technical lighting applications and in particular for daylight lighting, especially as functional lamps such as lamps for workplaces with computer monitor screens, secondary lighting, spotlamps, or lighting elements such as illuminated ceilings or light deflecting lamellae.

The present invention relates also to a process for manufacturing a reflectivity enhancing composite layer as reflecting surface layer on the body of reflectors, where the composite layer features an aluminium layer facing the reflector body, an HI layer with a refractive index $n_2$ facing the radiation to be reflected and an intermediate LI layer with a refractive index $n_1$ which is smaller than $n_2$ That objective is achieved by way of the invention a) an oxidizable outer layer is deposited on the aluminum layer of the composite surface layer, the thickness of which deposited layer is chosen such that after complete oxidation of the outer layer material, a HI layer of thickness $d_2$ is formed satisfying the relationship:

$$d_2 \cdot n_2 = l_2 \cdot \lambda/4 \pm 10 \text{ nm}$$

where $d_2$ represents the thickness of the HI layer in nm, $n_2$ refractive index of the HI layer, $\lambda$ the average wave length in nm of the light striking the reflector surface and $l_2$, an uneven natural number, and b) the reflector body, at least that part of the aluminum layer bearing the outer layer, is introduced into an electrolyte that does not redissolve aluminum oxide, is made the anode and is electrolytically anodized until the complete thickness of outer layer material has been oxidized into a HI layer and a LI aluminum oxide barrier layer has been formed from the aluminum layer, the thickness of the said barrier layer satisfying the relationship:

$$d_1 \cdot n_1 = l_1 \cdot \lambda/4 \pm 10 \text{ nm}$$

where $d_1$ represents the thickness in nm of the LI layer having a refractive index $n_1$, and $l_1$ is an uneven natural number.

The process according to the invention permits reflectivity enhancing composite layers to be produced on aluminium layers, whereby the HI and LI layers are thin, have an exactly predetermined layer thickness, are pore-free, homogeneous and are transparent to electro-magnetic radiation, especially in the visible and/or infra-red range.

Suitable for the process according to the invention are aluminium layers that are part of an item e.g. section, beam or another form of item, a plate, strip, sheet or foil of aluminium, or represent an outer aluminium layer of a composite, in particular an aluminium outer layer of a laminate panel, or an aluminium layer deposited e.g. electrolytically on any material of choice. In a preferred version the aluminium required for the process according to the invention is formed by the surface layer of an item made of aluminium, where the said item may be manufactured e.g. by a rolling, extrusion, forging or a press-forming process.

Suitable for the process according to the invention are all commercially available aluminium alloys and aluminium of all purity levels. For example the term aluminium includes all rolling, wrought, forging, and extrusion alloys of aluminum. Usefully, the aluminum layer is of pure aluminum with a purity of 98.3 wt. % or more, or aluminum alloys made from this aluminum alloyed with at least one of the following elements: Si, Mg, Cu, Zn or Fe. The aluminum layer of pure aluminum has a purity of 98.3 wt. % or more, usefully 99.0 wt. % and more, preferably 99.9 wt. % and more and in particular 99.95 wt. % and more.

Besides aluminum of the above mentioned purity, the aluminum layer may also contain 0.25 to 5 wt. %, especially 0.5 to 2 wt. % magnesium, or 0.2 to 2 wt. % manganese, or 0.5 to 5 wt. % magnesium and 0.2 to 2 wt. % manganese, especially e.g. 1 wt. % magnesium and 0.5 wt. % manganese, or 0.1 to 12 wt. %, preferably 0.1 to 5 wt. % copper, or 0.5 to 5 wt. % zinc and 0.5 to 5 wt. % magnesium, or 0.5 to 5 wt. % zinc, 0.5 to 5 wt. % magnesium and 0.5 to 5 wt. % copper, or 0.5 to 5 wt. % iron and 0.2 to 2 wt. % manganese, in particular e.g. 1.5 wt. % iron and 0.4 wt. % manganese.

The aluminum layer may, prior to the process according to the invention, also be subjected to a bending, deep-drawing, cold impact extrusion or a similar process and/ or may also be structured.

To produce reflectors according to the invention, it is necessary to have a clean aluminum surface i.e. the aluminum surface which is to be anodically oxidized must be treated prior to the process according to the invention to a surface treatment process, the so called pre-treatment.

The aluminium surfaces usually exhibit a naturally occurring oxide layer which, frequently because of prior handling etc. is contaminated by foreign substances. Such foreign substances may for example be residual rolling lubricant, oils for protection during transportation, corrosion products or pressed in foreign substances or the like. In order to remove such foreign substances, the aluminium surfaces are normally pre-treated chemically with a cleaning agent that produces some degree of attack by etching. Suitable for this purpose, apart from aqueous acidic degreasing agents, are in particular alkaline degreasing agents based on polyphosphate and borate. A cleaning action with moderate to strong removal of material is achieved by caustic or acidic etching using strongly alkaline or acidic pickling solutions such as e.g. caustic soda or a mixture of nitric acid and hydrofluoric acid. In that cleaning process the natural oxide layer is removed and along with it all the contaminants contained in it. When using strongly attacking alkaline pickling solutions, a pickling deposit often forms and has to be removed by an acidic after-treatment. A surface treatment without removing surface material takes the form of a degreasing treatment and may be performed by using organic solvents or aqueous or alkaline cleaning agents.

Depending on the condition of the surface, it may also be necessary to remove surface material using mechanical means. Such a surface treatment may be performed e.g. by grinding, surface blasting or polishing, and if desired may be followed by a chemical after-treatment.

In the blank metallic state aluminum surfaces exhibit a very high capacity to reflect light and heat. The smoother the surface, the greater is the directional reflectivity and the brighter the appearance of the surface. The highest degree of brightness is obtained with high purity aluminum and special alloys such as e.g. AlMg or AlMgSi alloys.

A highly reflective surface is obtained e.g. by polishing, milling, by rolling with highly polished rolls in the final pass or by chemical or electrolytic polishing. The polishing may be performed using cloth wheels with soft cloth. When polishing with rolls it is possible to introduce a given structure to the surface of the aluminum using engraved or etched steel rolls or by placing some means exhibiting a given structure between the rolls and the material being rolled. Chemical polishing or brightening is performed e.g. by using a highly concentrated acid mixture normally at high temperatures of around 100° C. Acidic or alkaline electrolytes may be employed for electrolytic brightening; normally acidic electrolytes are preferred.

In order to maintain the bright finish, the brightened surfaces must be protected from adverse chemical and physical effects or conserved. The state-of-the-art methods such as e.g. dc-$H_2SO_4$ anodising exhibit the disadvantages mentioned above such as large and difficult to control layer thicknesses or inhomogeneous layers.

The process according to the invention provides reflectors with a reflectivity enhancing composite layer whose LI and HI layers on an aluminium layer exhibit a homogeneous, uniform and predefined layer thickness, which are essentially transparent at least in the visible light range, so that the reflection of the light can take place essentially at the LI layer/aluminum interface.

For the anodizing process according to the invention the aluminum surface is given a predetermined, defined surface finish onto which an oxidizable outer layer is deposited. Surface layer materials employed are e.g. alkali metals e.g. Li, Na, K, alkali-earth metals e.g. Mg, Ca, Sr, Ba and/or transition metals such as e.g. Sc, Ti, V, Cr, Mn, Fe, Co, Ni, Y, Zr, Nb, Mo, Te, Ru, Rh, Pd, Hf, Ta, W, Re, Os, Ir, Pt and/or lanthanides such as e.g. La, Ce, Pr, Nd, Pm, Dy, Yb or Lu, etc. Preferred are Ti, PrTi, LaTi, Ta, Hf, Nb, Zn, Ce or an alloy of the mentioned substances. Especially preferred is the use Qf Ti, Ta, PrTi and LaTi. The outer layer materials are deposited on the aluminum layer usefully by means of a PVD or CVD process or electrolytically. It is preferable, however, to deposit the outer layer material by sputtering or vapor deposition such as by electron beam vaporization.

The thickness of the outer layer is specified by means of simple trials or from tables taking into account the increase in volume during oxidation of the outer layer material and namely such that the HI layer formed in the subsequent anodizing process satisfies the relationship $d_2.n_2=l_2.\lambda/4\pm10$ nm, whereby optical thicknesses of the HI layer with $l_2$ equal to 1 or 3 are preferred.

The reflector body, at least the part bearing the outer layer is subsequently immersed in an electrically conductive fluid and connected up as the anode to a direct current source, the negative electrode normally being stainless steel, graphite, lead or aluminum.

The electrolyte is according to the invention selected such that the aluminum oxide formed during the anodising process does not dissolve i.e. there is no resolution of the aluminum oxide. During the process hydrogen gas is formed at the cathode and gaseous oxygen at the anode. The oxygen forming at the anode reacts with the aluminum and forms an oxide layer that increases in thickness in the course of the process. As the electrical resistance of the barrier layer increases quickly, the amount of current flowing decreases correspondingly and the growth of the layer comes to a halt. At the same time, the metal of the outer layer is anodically oxidized. The process of anodic oxidation lasts until at least all of the outer layer material has been completely oxidised and the aluminum oxide barrier layer has reached the desired thickness.

Manufacturing LI and HI layers electrolytically by the process according to the invention enables the layer thicknesses to be controlled precisely. The maximum thickness of the aluminium oxide barrier layer achieved by the process according to the invention corresponds approximately in nm to the voltage in volts (V) applied i.e. the maximum thickness of layer obtained is a linear function of the anodizing voltage, taking into account the voltage drop in the outer layer. The exact value of the maximum layer thickness obtained as a function of the applied direct voltage U, taking into account the voltage drop in the outer layer, can be determined by a simple trial and lies between 1.2 and 1.6 nm/V, whereby the exact value of layer thickness as a function of the applied voltage depends on the electrolyte employed i.e. its composition and temperature.

Accordingly the minimum applied voltage $U_{min}$ in volt is:

$$d_1/1.6 \leq U_{min} \leq d_1/1.2$$

where $d_1$ represents the thickness in nm of the LI layer with refractive index $n_1$ which has to satisfy the following relationship $$d_1.n_1=l_1.\lambda/4\pm10 \text{ nm}$$

In order to take into account the change in voltage drop as a function of time, the applied anodising voltage may be raised continuously or in steps throughout the anodising process. The optimum anodising voltage or the optimum change in anodizing voltage and the duration of anodizing may be determined in a simple trial beforehand or via reflectivity measurements made during the anodizing process.

The electrolytic oxidation may be carried out in a single process step by applying a predetermined anodising voltage, or continuously or in a series of steps in which the anodizing voltage is raised to a predetermined level or to a level which is determined by measuring the optimum reflectivity characteristics. The electrolytic oxidation may, however, be performed in a plurality of steps i.e. in a plurality of process steps, e.g. employing different anodizing voltages.

Preferred is a process in which the reflectivity characteristics of the composite layer are measured continuously and the anodizing voltage U in volts, starting from $U_A$ the initial voltage according to the relationship $$d_1/1.6 \leq U_A \leq d_1/1.2$$

is increased continuously or in a series of steps until the measured reflectivity has reached a desired maximum.

By using a non-redissolving electrolyte the aluminum oxide barrier layers are almost pore-free, i.e. any pores resulting e.g. from contaminants in the electrolyte or structural faults in the aluminium surface layer, but only insignificantly due to dissolution of the aluminum oxide in the electrolyte. The same holds for the outer layer materials, i.e. these must also behave chemically inert in the electrolyte employed.

Usable as non-redissolving electrolytes in the process according to the invention are e.g. organic or inorganic acids, as a rule diluted with water, having a pH of 2 and more, preferably 3 and more, especially 4 and more and 7 and less, preferably 6 and less, especially 5.5 and less. Preferred are electrolytes that function cold i.e. at room temperature. Especially preferred are inorganic or organic acids such as sulphuric or phosphoric acid at low concentration, boric acid, adipinic acid, citric acid or tartaric acid, or mixtures thereof, or solutions of ammonium or sodium salts of organic or inorganic acids., especially the mentioned acids and mixtures thereof. In that connection it has been found that the solutions preferably contain a total concentration of 20 g/l or less, usefully 2 to 15 g/l of ammonium or sodium salt dissolved in the electrolyte. Especially preferred are solutions of ammonium salts of citric or tartaric acidic or sodium salts of phosphoric acid.

A very highly preferred electrolyte contains 1 to 5 wt. % tartaric acid to which may be added e.g. an appropriate amount of ammonium hydroxide ($NH_4OH$) to adjust the pH to the desired value.

The electrolytes are as a rule aqueous solutions.

The maximum possible anodizing voltage is determined by the dielectric strength of the electrolyte. This is dependent for example on the electrolyte composition and temperature, and normally lies in the range of 300 to 600 V.

Alcohol may be added to the electrolyte as a further solvent e.g. in order to raise the dielectric strength of the electrolyte. Suitable for that purpose are in particular methanol, ethanol, propanol such as e.g. propylalchol or isopropanol, or butanol. The amount of alcohol added to the electrolyte is not critical so that the quantitative ratio of electrolyte to solvent may e.g. amount to 1:500. By adding alcohol the dielectric strength of the electrolyte may be raised e.g. to 1200 V. For the process according to the invention, however, alcohol-free electrolytes are preferred.

The optimum electrolyte temperature for the process according to the invention depends on the electrolyte employed, is, however, of lesser importance for the quality of the LI/HI layers obtained. Temperatures of 15° to 40° C., especially between 18° and 30° C., are employed for the process according to the invention.

The process according to the invention is especially suitable for continuously or piece-by-piece manufacture of a reflectivity enhancing composite layer on strips, sheets, foils or individual items of aluminum, and for composite layers having at least an outer layer of aluminum. The process according to the invention is especially suitable for continuous production of reflectors with a reflectivity enhancing composite layer using a continuous production line such as e.g. strip coating and anodising line.

As the aluminum oxide barrier layer acting as the LI layer is thin, compared with an oxide layer produced by dc-$H_2SO_4$ anodizing, it contains only few foreign particles that are responsible for scattering light in the protective layer, i.e. scattering centres such as particles of Fe, Si or AlFeSi. Furthermore, the absorption of the incident light, which is a linear function of layer thickness, is small in the reflectors according to the invention. Also, because of the small thicknesses of the LI and HI layers, the amount of scattering at bent edges, in particular that resulting from cracks in the layers of the composite, are normally negligibly small.

In the case of oxide layers produced by dc-$H_2SO_4$ anodising, because of the variation in layer thickness that arises with large layer thickness, selective absorption occurs and results in problems due to iridescence. With the composite layer according to the invention—because of the small thicknesses of the LI and HI layers and because of their very constant thickness over the surface of the reflector, no iridescence (rainbow colors) arises. In addition, as a result of the thickness of the LI and HI layers, the distances between the reflecting planes that lead to iridescence effects is too small.

FIG. 1 shows schematically the cross-sectional structure of the reflector of the present invention. The reflector includes a reflector body 10, an aluminum layer 20 facing the reflector body, an outer layer 30 (the HI layer) with a refractive index $n_2$ facing the radiation to be reflected, and an intermediate aluminum oxide layer 25 (the LI layer) with a refractive index $n_1$ which is smaller than $n_2$. Referring to FIG. 1, $d_1$ represents the thickness of the LI layer in nm and $d_2$ represents the thickness of the HI layer in nm.

I claim:

1. Reflector which comprises a composite reflectivity-enhancing layer as reflecting surface layer on a reflector body, wherein the said composite has a sandwich structure with an aluminum layer facing the reflector body, an outer HI-layer with a refractive index $n_2$ facing the radiation to be reflected, and an intermediate aluminum oxide LI-layer with a refractive index $n_1$ which is smaller than $n_2$, and wherein the LI-layer is a transparent and pore-free barrier layer produced by anodic oxidation of the aluminum layer and having a dielectric constant $\epsilon_1$ of 6 to 10.5 at 20° C. and the optical layer thickness $d_{opt,1}$ of the LI-layer and $d_{opt,2}$ of the HI-layer are such that $$d_{opt,i} = d_i . n_i = l_i . \lambda/4 \pm 10 \text{ nm}, \ i=1,2$$

where $d_1$ represents the thickness of the LI-layer in nm, $d_2$ the thickness of the HI-layer in nm, $\lambda$ the average wave length in nm of the light striking the reflector surface in the range of 350 to 750 nm and $l_1$, $l_2$ uneven natural numbers, and wherein LI indicates low refractive index and HI indicates high refractive index.

2. Reflector according to claim 1, wherein the thicknesses $d_1$ of the LI-layer and $d_2$ of the HI-layer are each between 30 and 190 nm, whereby the thicknesses $d_1$ and $d_2$ measured at any particular spot do not differ by more than ±5% from the average layer thicknesses $d_{1,av}$ and $d_{2,av}$ measured over the whole of the composite layer.

3. Reflector according to claim 1, wherein the HI-layer is selected from the group consisting of (1) an oxide of an alkali, alkali-earth or transition metal, (2) a lanthanide, and (3) an alloy comprising at least one of these substances.

4. Reflector according to claim 3, wherein the HI-layer is selected from the group consisting of Ti-oxide, PrTi-oxide, LaTi-oxide, Ta-oxide, Hf-oxide, Nb-oxide, Zn-oxide and Ce-oxide.

5. Process for manufacturing a reflector having a composite reflectivity-enhancing layer as reflecting surface layer on a reflector body, wherein the said composite has a sandwich structure with an aluminum layer facing the reflector body, an outer HI-layer with a refractive index $n_2$ facing the radiation to be reflected, and an intermediate aluminum oxide LI-layer with a refractive index $n_1$, which is smaller than $n_2$, and wherein LI indicates low refractive index and HI indicates high refractive index, which comprises:

a) depositing an oxidizable outer layer on an aluminum layer of the composite surface layer, the thickness of which deposited layer is chosen such that after complete oxidation of the outer layer material, a HI-layer of thickness $d_2$ is formed satisfying the relationship $$d_2 . n_2 = l_2 . \lambda/4 \pm 10 \text{ nm}$$

where $d_2$ represents the thickness of the HI-layer in nm, $n_2$ the refractive index of the HI-layer, $\lambda$ the average wave length in nm of the light striking the reflector surface in the range of 350 to 750 nm and $l_2$, an uneven natural number, and b) the aluminum layer bearing the outer layer, is introduced into an electrolyte that does not redissolve aluminum oxide, is made the anode and is electrolytically anodized until the complete thickness of outer layer material has been oxidized into a HI-layer and a LI-aluminum oxide barrier layer has been formed from the aluminum layer, the thickness of the said barrier layer satisfying the relationship:

$$d_1.n_1 = l_1.\lambda/4 \pm 10 \text{ nm}$$

where $d_1$ represents the thickness in nm of the LI-layer having a refractive index $n_1$, and $l_1$ is an uneven natural number.

6. Process according to claim 5, wherein the outer layer material is deposited by means of a physical vapor deposition process.

7. Process according to claim 5, wherein a material selected from the group consisting of (1) an alkali, alkali-earth or transition metal, (2) a lanthanide, and (3) an alloy comprising at least one of these substances, is employed as the outer layer material.

8. Process according to claim 7, wherein a material selected from the group consisting of Ti, PrTi, LaTi, Ta, Hf, Nb, Zn and Ce, is employed as the outer layer material.

9. Process according to claim 5, wherein during electrolytic oxidation, the reflectivity characteristics of the composite layer are measured continuously and the anodizing voltage U in volts starting from an initial value $U_A$ according to the following relationship $$d_1/1.6 \leq U_A \leq d_1/1.2$$

is increased continuously or in a series of steps until the measured reflectivity has reached a desired maximum value.

10. Process according to claim 5, wherein the production of the reflectivity enhancing composite layer takes place continuously using a strip type of process.

* * * * *